United States Patent [19]
Ryan et al.

[11] 4,053,837
[45] Oct. 11, 1977

[54] QUADRIPHASE SHIFT KEYED ADAPTIVE EQUALIZER

[75] Inventors: Carl R. Ryan, Mesa; James H. Stilwell, Scottsdale, both of Ariz.

[73] Assignee: Motorola Inc., Schaumburg, Ill.

[21] Appl. No.: 745,264

[22] Filed: Nov. 26, 1976

Related U.S. Application Data

[63] Continuation of Ser. No. 586,105, June 11, 1975, abandoned.

[51] Int. Cl.² ............................................. H03H 7/36
[52] U.S. Cl. ....................................... 325/323; 333/18
[58] Field of Search ................. 325/41, 42, 320, 323; 235/181; 178/67, 69 R; 328/155, 162, 163; 333/18

[56] References Cited

U.S. PATENT DOCUMENTS

| | | | |
|---|---|---|---|
| 3,400,332 | 9/1968 | O'Neill, Jr. et al. | 325/42 |
| 3,755,738 | 8/1973 | Gitlin et al. | 333/18 |
| 3,878,468 | 4/1975 | Falconer et al. | 333/18 |
| 3,906,347 | 9/1975 | Motley et al. | 333/18 |
| 3,914,691 | 10/1975 | Meadors, Jr. | 325/42 |
| 3,947,768 | 3/1976 | Desblache et al. | 333/18 |

Primary Examiner—Benedict V. Safourek
Attorney, Agent, or Firm—Eugene A. Parsons

[57] ABSTRACT

A quadriphase shift keyed (QPSK) adaptive equalizer includes baseband inphase (I) and quadrature (Q) adaptive filters for receiving demodulated OPSK signals. The I and Q channel filters are designed to operate independent of each other and adapt their characteristics continuously in a predetermined manner in response to an incoming received QPSK signal, distorted in an unknown time varying manner.

5 Claims, 8 Drawing Figures

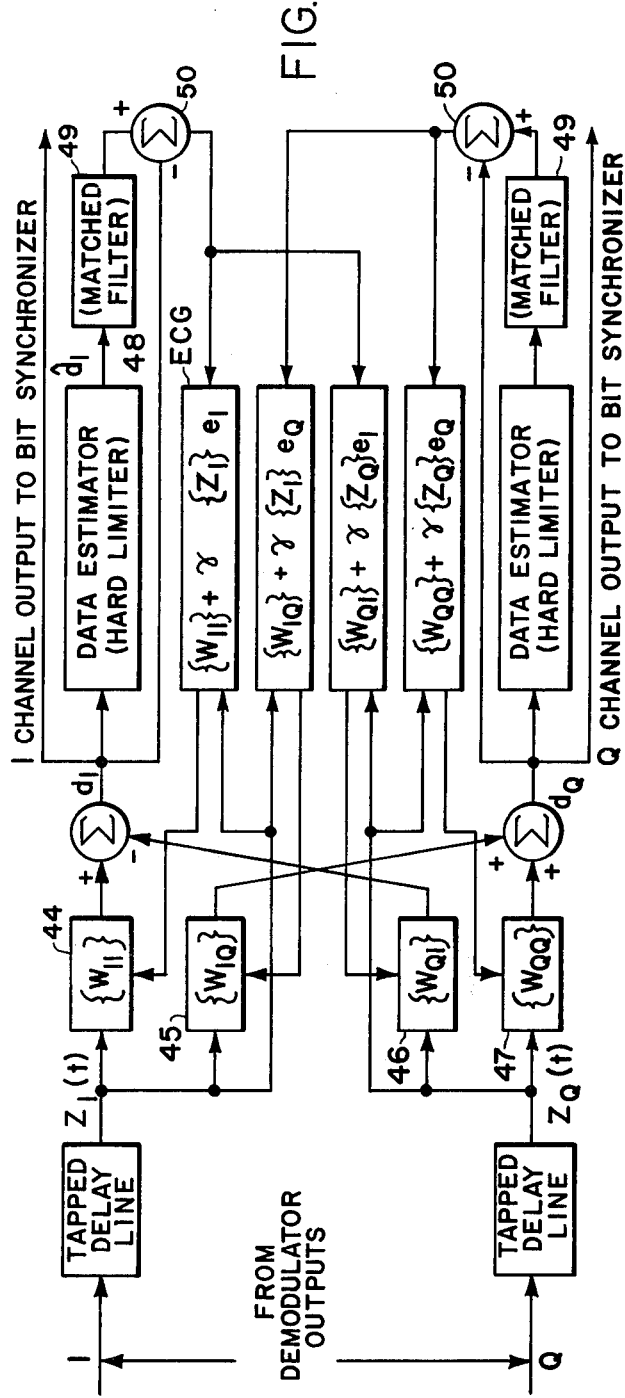
FIG. 4
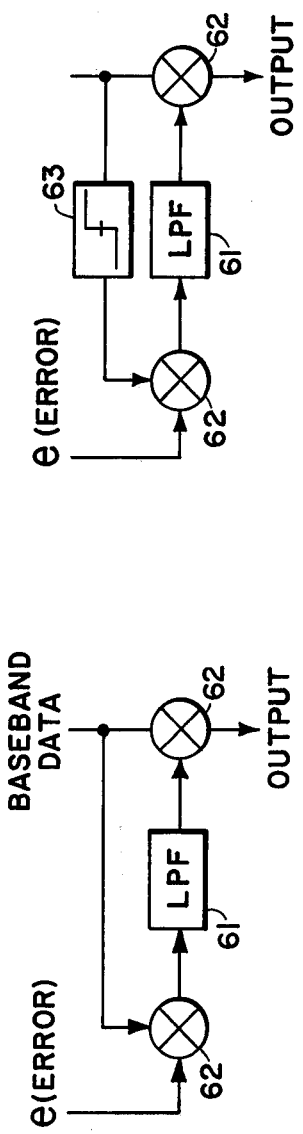
FIG. 6B
FIG. 6A

4,053,837

QUADRIPHASE SHIFT KEYED ADAPTIVE EQUALIZER

This is a continuation, of application Ser. No. 586,105, filed June 11, 1975 now abandoned.

BACKGROUND OF THE INVENTION

1. Field of the Invention

This invention relates to equalizers in general and more particularly, to an improved equalizer for handling QPSK signals that have been subjected to various types of distortions.

2. Prior Art

Extensive usage of digital data communication systems have placed an increased emphasis on optimizing RF wide band data transmission utilizing modulation techniques. In this connection, serious efforts have been directed in the recent years to improve the modulation techniques for high speed data transmission. Generally, the modulation scheme used entails a trade-off between signal power and bandwidth, usually in favor of bandwidth in order to provide faster data transmission in a limited bandwidth. More recently, quadriphase shift keyed modulation (QPSK) have become popular as opposed to the usual biphase shift keyed modulation (BPSK).

QPSK modulation provides a twofold increase in the signal data transmission with identical bandwidths compared to BPSK modulation. In theory identical performance is possible with QPSK as compared to BPSK when twice the transmitted power is used. In practice, however, it is found that this theoretical level of performance is not attainable in QPSK systems because of distortions due to the additive noise, hardware deficiencies, and media dispersion on the received signal most of which are more pronounced in QPSK systems than in BPSK systems. In particular, it has been found that the phasor distortions resulting from such things as typical modulator and demodulator hardware and mistuned bandpass filters are often extremely severe. These distortions tend to compromise the otherwise advantageous characteristics of a higher data transmission speed of a QPSK modulation system and compound the adverse effect already imposed on the signal by the additive noise.

In handling the distortions of the QPSK signals, various equalization approaches have been utilized to date. Of these, the so-called linear adaptive equalizer, such as that described in "Simultaneous Adaptive Estimate and Decision Algorithm for Carrier Modulated Data Transmission System" by H. Kobayashi, IEEE Transaction on Communications Technology, Vol. COM 19, June, 1971 pages 268–280 appear to be popular. For the QPSK configuration, the linear adaptive equalizer usually includes the inphase (I) and quadriphase (Q) channel adaptive filters for providing the equalization to the incoming QPSK demodulated signals.

The adaptive equalizer filter is generally configured in the form of tapped delay line transversal filters with each tap being weighted and the taps being summed together. The tap weightings determine the filter characteristics. Generally, the circuit means utilized for deriving the two channel filters are designed to be identical by assuming that the inphase and quadrature signals have been subjected to distortions of identical nature and that, therefore, the same equalization filtering is required for the two incoming QPSK demodulated signals, i.e., the inphase and quadrature signals.

SUMMARY OF THE INVENTION

It has been found that although the conventional adaptive equalizer can be implemented in QPSK modem, it is not capable of handling the distortions encountered in practical QPSK systems in a satisfactory manner. This is because it is found that, in a QPSK system, the two demodulated signals generally experience different distortions; therefore, the provision of equalization filters of identical characteristics, as conventionally provided, does not adequately correct the distortions introduced to the signals in transit.

It is an object of the present invention to improve the performance characteristics of a wideband QPSK adaptive equalizer.

It is yet another object of the present invention to overcome the aforementioned problems and shortcomings found in the conventional QPSK equalizer.

It is yet another object of the present invention to correct errors introduced by the hardware of the equalizer itself.

In accordance with the present invention, the aforementioned and other shortcomings of the prior art adaptive QPSK equalizer are overcome and the aforementioned and other objects of the invention are achieved by providing an equalizer which includes independent inphase and quadrature channel adaptive filters.

According to another feature of the present invention, the inventive equalizer of the present invention is utilized as a decision feedback equalizer.

It is found that the present inventive QPSK adaptive equalizer eliminates the need for having identically matched circuit elements in the two adaptive filters. This makes it possible to utilize circuit elements of less stringent tolerance limits without sacrificing the performance characteristics of the equalizer. This makes it also possible to manufacture at lesser cost.

The aforementioned and other objects and features and advantages of the present invention will become clearer from the following detailed description in conjunction with the accompanying drawings.

BRIEF DESCRIPTION OF THE DRAWINGS

FIG. 4 shows a schematic drawing of a modified linear equalizer in accordance with the present invention.

FIGS. 6A and 6B show schematic drawings of different configurations of the equalizer coefficient generators (ECG).

DETAILED DESCRIPTION OF THE PREFERRED EMBODIMENTS OF THE PRESENT INVENTION

Figure 1:
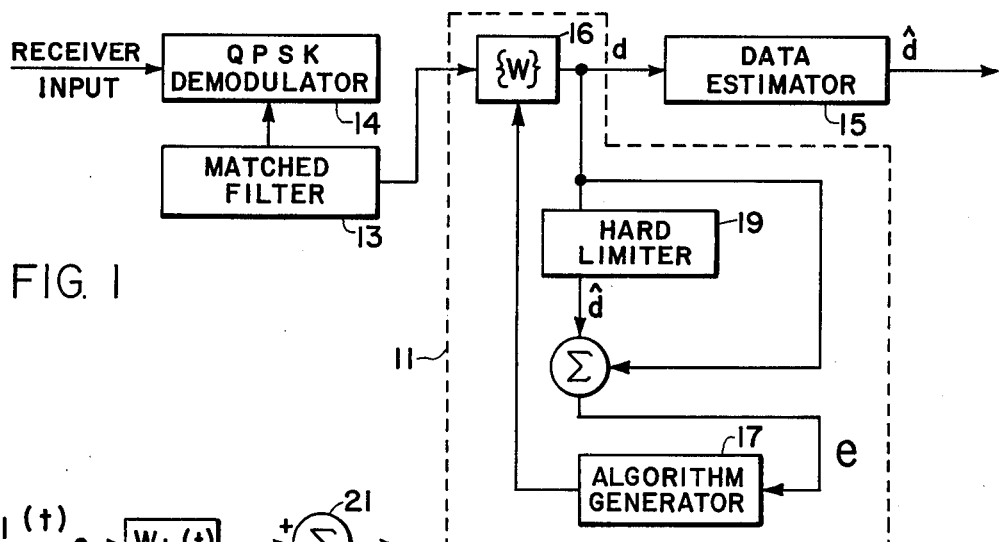
FIG. 1 shows a schematic block diagram of an adaptive equalized QPSK receiver.

FIG. 1 depicts in a block diagram form, a QPSK receiver in which the present inventive adaptive equalizer 11 is integrated. The adaptive equalizer 11, is placed between the matched filter 13 output and data estimator 15 of the receiver. The incoming or received signal is applied to the filter 13 via a QPSK demodulator 14. The demodulator 14 is used to convert incoming RF signal into the quadrature I and Q channel baseband signals. Advantageously, the present equalizer is so located that it compensates the distortions due to the hardware deficiencies and the transmission media distortions which create intersymbol interference found in the received signal.

Figure 2:
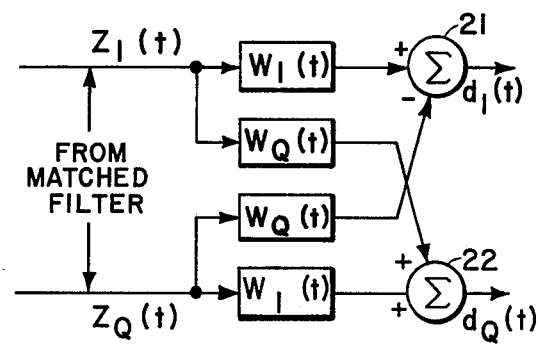
FIG. 2 shows a schematic block diagram of a conventional complex filter.
Figure 3:
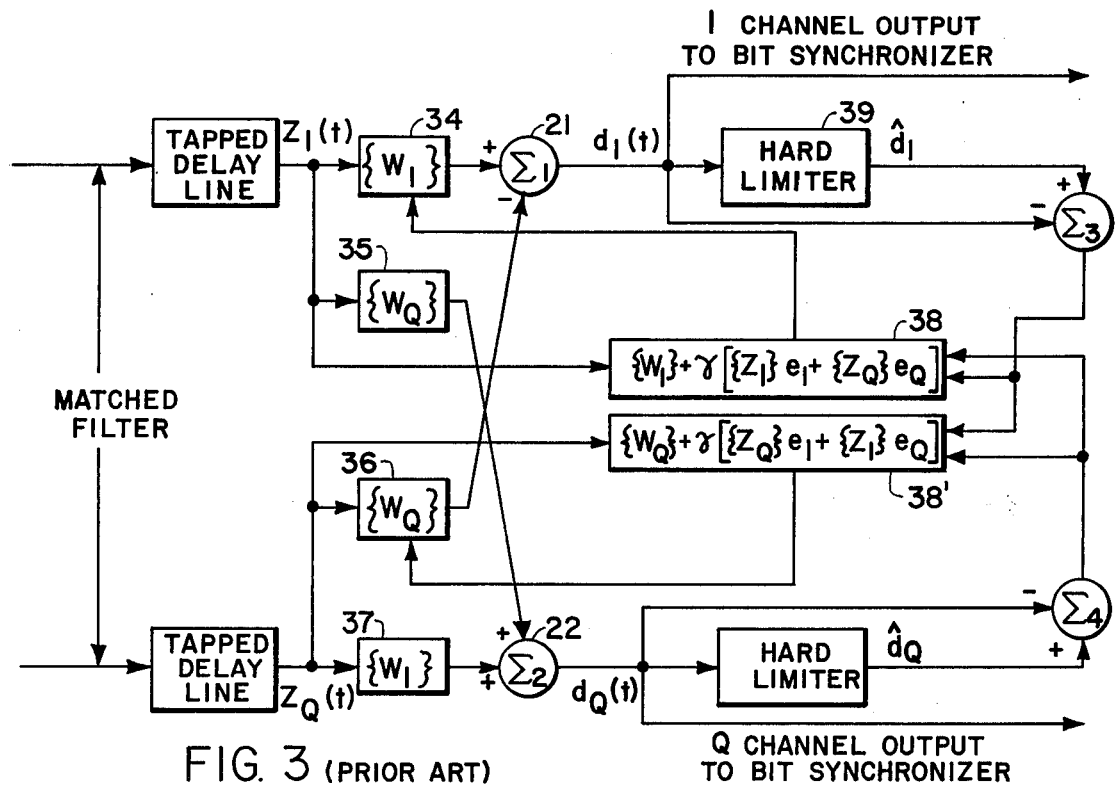
FIG. 3 shows a detailed diagram of a lineary equalizer with the filter configuration shown in FIG. 2.

According to the prior art, the adaptive equalizer, includes a conventional complex transversal filter network illustrated schematically in FIG. 2. As shown in FIG. 3, more specifically, the equalizer filter network 16 may be comprised of four simple transversal filters, $W_I(t)$, $W_Q(t)$, $W_Q(t)$ and $W_I(t)$, operatively connected to process incoming inphase (I) and quadrature (Q) channel signals $Z_I(t)$ and $Z_Q(t)$ from the matched filter 13. Each of the filters consists of a tapped delay line. Suitable summing means, 21 and 22, are provided for the I and Q channels to combine the tapped signal weights in a conventional manner.

According to the conventional system two demodulator outputs, $Z_I(t)$ and $Z_Q(t)$, from the demodulator 14 are processed by the equalizer through its filter network 16, prior to making the data estimates, in the data estimator 15. The equalizer filter network, 16, characteristics are continuously controlled by an algorithm generator 17 which compares the equalized outputs with data estimates derived through hardlimiter 19.

In operation, the equalizer filter network coefficients are made to vary slowly as a result of slow time varying distortions present in the data transmission system. Several data bits passing through the algorithm generator dictate a filter coefficient change. FIG. 3 shows the conventional equalizer 11 which includes a sequence decision circuitry in the form of hard limiters 39 and 39′ and the filter coefficient algorithm generators 38 and 38′ used to determine the transversal filter tapped delay line summing weights at the summing points, 21 and 22. The brackets {} around the filter tap coefficients, $W_I$ and $W_Q$, represent multiple taps in the transversal filter implementation.

The data estimator 15 may be in the form of a bit synchronizer and the data estimates may be made at the bit synchronizer as illustrated in FIG. 1 after the equalization is completed. A variation of this is to use the data estimates $\hat{d}_I$ and $\hat{d}_Q$ provided by a hard limiter 19 of the equalizer itself before the bit synchronization is performed. The algorithm, used to derive the filter tap coefficients, is the derivative of the equalizer output mean squared error (MSE) with respect to the equalizer input. This minimizes the equalizer output MSE and results from the straight forward cross correlation of the equalizer output errors and equalizer inputs.

A QPSK equalizer, modified in accordance with the present invention, is illustrated in FIG. 4; as illustrated, two basic modifications are made to the conventional adaptive equalizer structure. First, the modified configuration has independent filters 44–47 in the demodulated channels unlike that shown in FIGS. 2 and 3. This modification allows significant improvement in the performance of the equalizer in that they correct certain modulator and demodulator hardware phasor errors otherwise not possible, with the prior art equalizer. The basic reason for this performance improvement over the conventional equalizer is that the inventive equalizer provides independent channel filtering operation where $W_{II} \neq W_{IQ} \neq W_{QI} \neq W_{QQ}$.

The second modification of the modified equalization system relative to the conventional approach is the introduction of a low pass filter 49 and 49′ (LPF) following the data estimator 48 and 48′ (or hard limiter) for I and Q channels, as illustrated in FIG. 4. This filter serves the function of the matched filter 13. This allows the matched filter to be incorporated within the adaptive equalizer. This means that equalizer filter need not have as wide a bandwidth as otherwise required to match the sharp transition at the input of the estimator required to null the error at the summers 50 as is the case with the conventional equalizer. In other words, the equalizer can be of a narrower bandwidth hardware without sacrificing performance. This means that less costly hardware can be used to implement the present inventive adaptive equalizer.

MATHEMATICAL ANALYSIS OF THE EQUALIZERS

The characteristics of the conventional and the present inventive equalizerS, will be described in the form of mathematical analysis to enable the reader to understood the precise nature of the present invention.

CONVENTIONAL EQUALIZER

The conventional linear adaptive equalizer illustrated in FIG. 3 and described above, includes four transversal filters, 34–37, the hard limiters (data estimators) 39 and 39′, and the filter coefficient adjustment correlators 38 and 38′. The filter coefficient adjustment correlators, as algorithm generators, force the equalizer filter coefficients to minimize the mean squared errors (MSE; $e_I^2$ and $e_Q^2$) between the data estimators and the equalizer outputs. The functions provided by the various elements of the linear adaptive equalizer are expressed in FIG. 3 in a conventional mathematical form familiar to the person of average skill in this art.

The correlators 38 and 38′ shown in FIG. 3 are designed to minimize the expected value (E) or the sum of the mean square error (MSE) in both channels with respect to the equalizer coefficients $\{W\}$ where $\{W\} = \{W_I\} + j\{W_Q\}$. This may be shown as follows. $W_I$ is adjusted by minimizing $\nabla W_I [E [e_I^2] + E [e_Q^2]]$, the gradient ($\nabla$) of the sum of the MSE's with respect to $\{W_I\}$. $\{W_I\}$ implies the sequence of $2j + 1$ filter tap coefficient, $j$ being an integer number, $2j + 1$ being the number of filter taps, and $\{W_I\}$ being $$\{W_I\} = \begin{bmatrix} W_{I_j} \\ W_{I_o} \\ W_{I_j} \end{bmatrix} \quad \{Z_I\} \text{ means the sequence of values } Z_{I_j} \text{ where } 2j + 1 \text{ taps.}$$

in the transversal written filter and can be written as
$$\begin{bmatrix} Z_{I_j} \\ Z_{I_o} \\ Z_{I_{-j}} \end{bmatrix} \quad \{W_I\}' \text{ represents the matrix transpose of } \{W_I\}.$$

Thus $\{W_I\}'\{Z_I\} = [W_{I_j} \, W_{I_o} \, W_{I_{-j}}] \begin{bmatrix} Z_{I_j} \\ Z_{I_o} \\ Z_{I_{-j}} \end{bmatrix} \sum_{k=j}^{j} W_{I_k} Z_{I_k}$ The equalizer output errors are then: $e_I = \hat{d}_I - \hat{d}_I = d_I - [\{W_I\}' \{Z_I\} - \{W_Q\}' \{Z_Q\}]$ (1a)

and $$e_Q = d_Q - \hat{d}_Q = d_Q - [\{W_I\}'\{Z_Q\} + \{W_Q\}'\{Z_I\}] \quad (1b)$$

From (1a) and (1b)

$$\tfrac{1}{2}\nabla_{\{W_I\}}[E[e_I^2] + E[e_Q^2]] = -E[\{Z_I\} e_I + \{Z_Q\} e_Q] \quad (2a)$$

Therefore $\{W_I\}$ is adjusted such that the average or expected value of $\{Z_I\} e_I + \{z_Q\} e_Q$ is minimized. Likewise $W_Q$ is found by minimizing $$\tfrac{1}{2}\nabla_{W_Q}[E[e_I^2] + E[e_Q^2]] = -E[-\{Z_Q\} e_I + \{Z_I\} e_Q] \quad (2b)$$

These coefficient adjustment terms are shown in FIG. 3, 38 and 38' where Y is a constant which determines the speed of filter coefficient changes.

MODIFIED EQUALIZER

At high data rates, hardware distortion plays an important part in system performance degradation. Two common hardware distortions which can create severe performance degradation in conventional QPSK systems are modulator and demodulator phasor errors. To correct these system phasor distortions, in accordance with the present invention, the filters in the inphase (I) and quadriphase (Q) channels are made independent, as illustrated schematically in FIG. 4 that is $\{W_I\} \neq \{W_{II}\} \neq \{W_{QQ}\}$ and $\{W_Q\} \neq \{W_{QI}\} \neq \{W_{IQ}\}$ in general. The algorithm for minimizing the MSE of the modified equalizer structure and thus adjusting the equalizer filter coefficients results when the following equations are minimized:

$$\tfrac{1}{2}\nabla_{\{W_{II}\}}[E[e_I^2]] = E[\{Z_I\} e_I] \quad (3a)$$

$$\tfrac{1}{2}\nabla_{\{W_{IQ}\}}[E[e_Q^2]] = -E[\{Z_I\} e_Q] \quad (3b)$$

$$\tfrac{1}{2}\nabla_{\{W_{QI}\}}[E[e_I^2]] = E[\{Z_Q\} e_I] \quad (3c)$$

$$\text{and } \tfrac{1}{2}\nabla_{\{W_{QQ}\}}[E[e_Q^2]] = -E[\{Z_Q\} e_Q] \quad (3d)$$

In a manner similar to that of equation 2, equation 3 is minimized by the proper selection of $\{W\}$ which results in minimizing equation 3 shown in FIG. 4. For example, the optimum value of $\{W_{II}\}$ results by minimizing the correlation between $\{Z_I\}$ and $e_I$, i.e., minimized $\{Z_I\} e_I$.

Thus, the W [$\{W_{II}\}$, $\{W_{QI}\}$, $\{W_{IQ}\}$ and $\{W_{QQ}\}$] tap gain coefficients are varied to adjust the equalizer filter in such a manner as to minimize the correlation between the equalizer input, $\{Z\}$, and the error outputs $e$.

Figure 5:
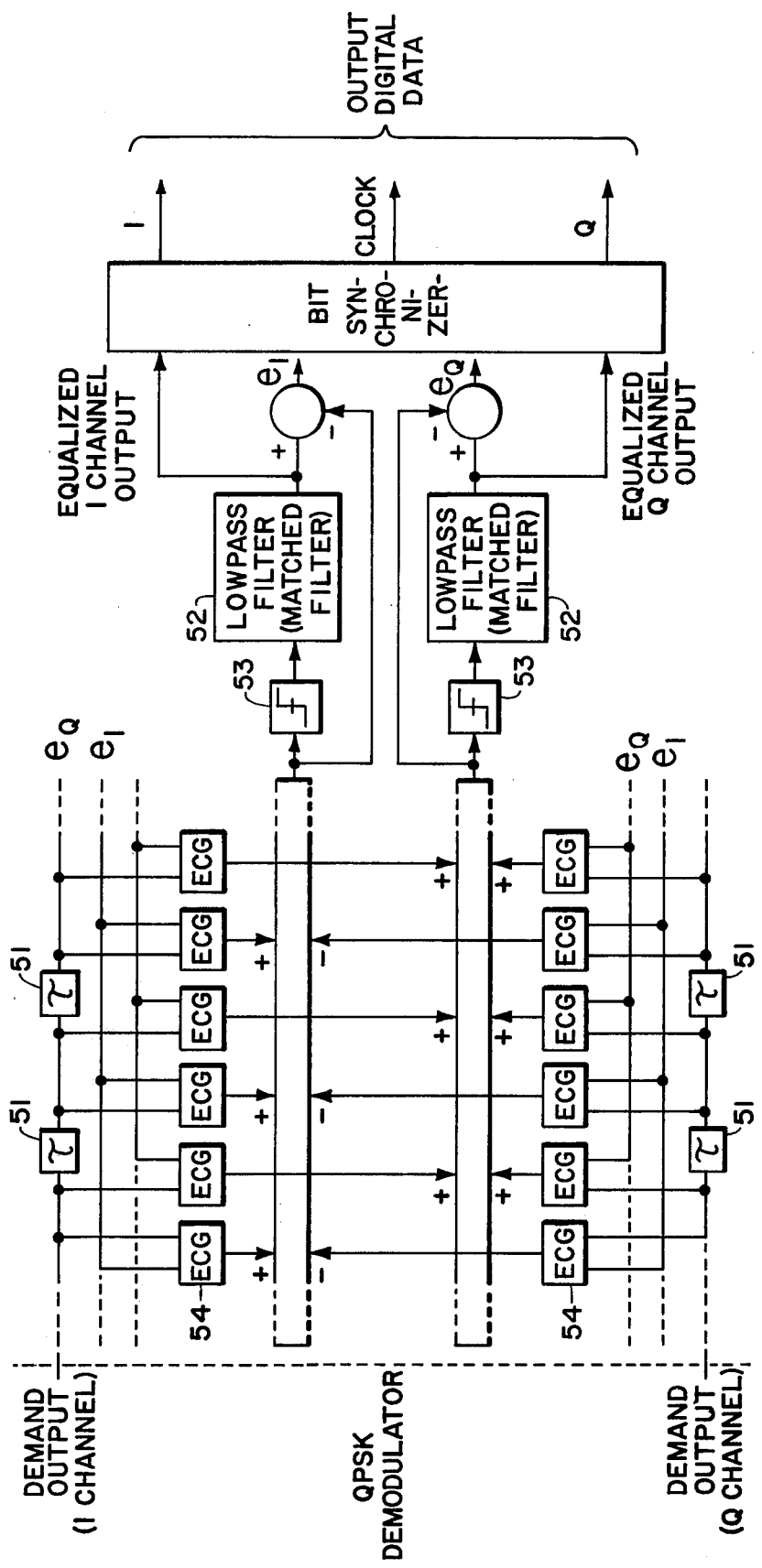
FIG. 5 shows an illustrative linear equalizer based on the present invention.

Note from the equations (1) and (3), for both the conventional equalizer (FIG. 3) and modified equalizer structure (FIG. 4), the filter tap weightings (or coefficients) are the result of averaging the correlation between the unequalized inputs and the corresponding equalizer output errors. To amplify this concept and show the modified equalizer structure of this disclosure, FIG. 5 expands FIG. 4. The delay line is tapped with spacings in time, $\tau$, between the adjacent taps of less than or equal to one data symbol time, $\tau$. The data estimation filter 52 shown in FIG. 5 is a low pass filter LPF which represents the matched filter for the digital data detection under additive noise conditions.

Figure 7:
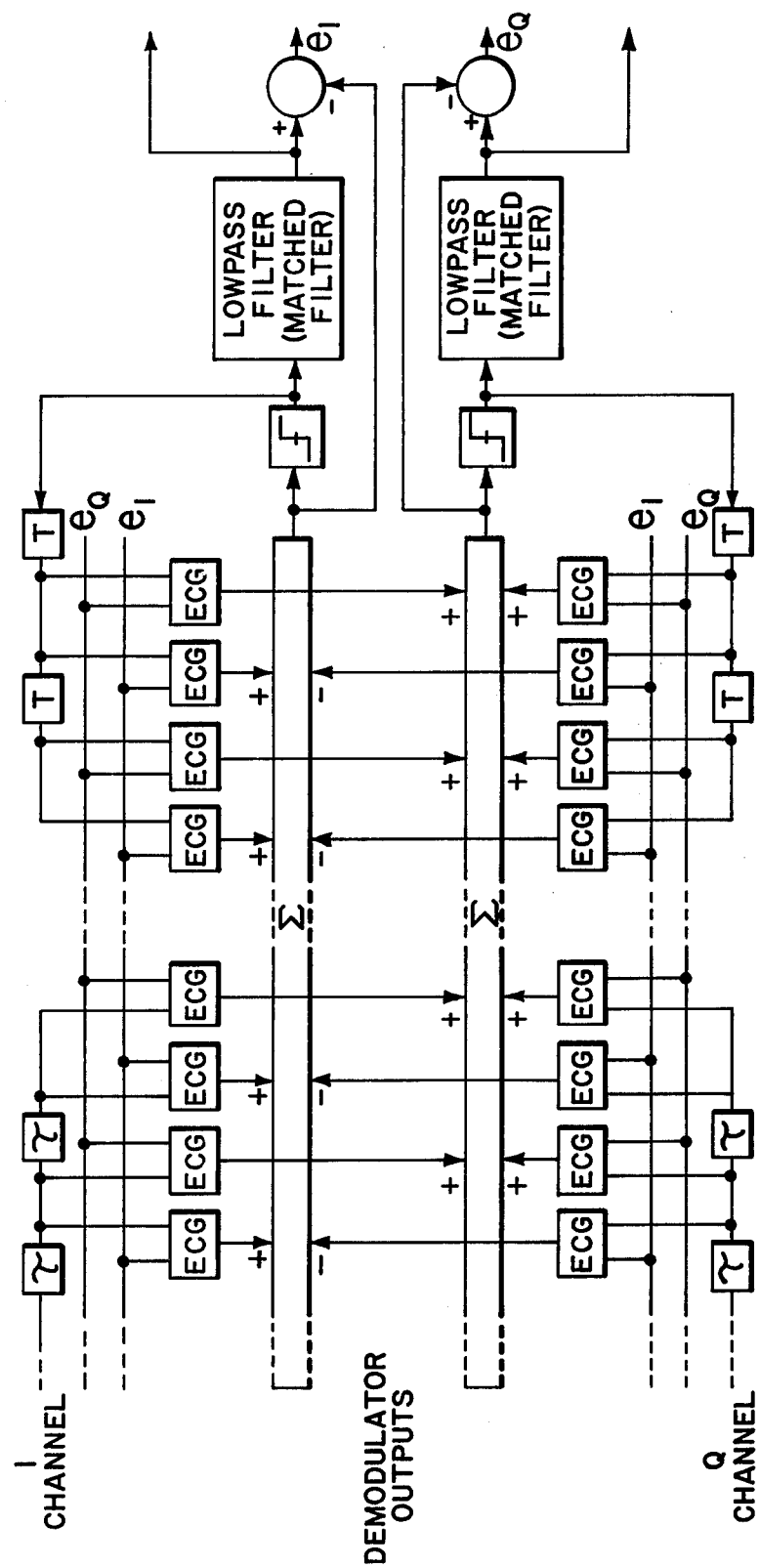
FIG. 7 shows a schematic drawing of a decision feedback equalizer that utilizes the equalizer circuitry of the invention.

Although the foregoing discussion considers only the equalization algorithm which minimizes the equalizer output MSE, other algorithms are possible, such as introducing coding in the data estimate or zeroing the output error at specific points on the impulse response. Nevertheless, the concepts introduced in this disclosure still hold. The equalizer coefficient generator (ECG) 54 shown in FIG. 5 is illustrated in greater detail in FIGS. 6A and 6B. FIG. 6 shows the equalizer coefficient generators ECG used for minimizing the equalizer output mean squared error as illustrated in FIGS. 5 and 7. The low pass filter 61 determines the time required to change the filter coefficient and thus the filter response time for abrupt distortion changes. The multiplier 62 62', 64, and 64' in FIGS. 6A and 6B are four quadrant multipliers. FIG. 6B shows an alternate implementation of the ECG which forces the equalizer filter coefficients to zero or null the equalizer output errors at specific points on the impulse response. The hardlimiter 63 and LPF 61 are identical to that previously discussed. Multipliers 64 and 64' represent a single equalizer filter coefficient of $\{W_{II}\}$, $\{W_{QQ}\}$, $\{W_{QI}\}$ or $\{W_{IQ}\}$, thus 64 and 64' are actually part of 44→47 of FIG. 4.

An alternate equalizer structure which uses the modified equalizer format of this disclosure (independent channel filtering) is shown in FIG. 7. The only difference in this structure and that shown in FIG. 5 is that some of the filter taps come from the hardlimited data estimates of the equalizer output as is done with conventional decision feedback equalizer. In this structure the filter taps coming from the hardlimiter (data estimating means) are spaced one data symbol time (T) apart. The equalizer coefficient generators (ECG) are identical to FIG. 5 as are all other parts of this modified decision feedback equalizer.

Various changes and modifications will be apparent to one of ordinary skill without departing from the spirit and scope of the present invention.

What is claimed is:

1. A quadraphase shift keyed (QPSK) adaptive equalizer having in-phase and quadrature channels for equalizing incoming demodulated QPSK signals, comrising:
   a. first and second tapped delay lines connected to received the demodulated signals and provide in-phase and quadrature output signals in the in-phase and the quadrature channels;
   b. means for developing error signals connected to an output of each of the in-phase and quadrature channels; and
   c. in-phase and quadrature filter means connected to receive the in-phase and quadrature output signals, respectively, and the error signals, each filter means including first and second adjustable components and independent equalizer coefficient generator means associated with each of said components for individually adjusting said associated components to minimize the error signals in each channel.

2. The equalizer according to claim 1 wherein the in-phase and quadrature filter means include first, second, third and fourth adjustable filter components each having an input, output and a control terminal, each of said filter components differing from the others in operating characteristics; first and second summing means each having two inputs and an output, the outputs of said first and fourth filter components being connected to the inputs of said first summing means and the outputs of said second and third filter components being connected to the inputs of said second summing means; first, second, third and fourth equalizer coefficient generators each operating according to a different algorithm from the others and each having two inputs and an output; the inputs of said first and third filter components and one input of each of said first and third coefficient generators being connected to receive the in-phase signal from said first tapped delay line and the input of said second and fourth filter components and one input of each of said second and fourth coefficient generator being connected to receive the quadrature signal from said second tapped delay line; the second inputs of said first and fourth coefficient generators being connected to receive the error signal from the in-phase channel and the second inputs of said second and third coefficient generators being connected to receive the error signal from the quadrature channel; and the outputs of said first and second summing means being the in-phase and quadrature channel outputs, respectively.

3. The equalizer according to claim 1, wherein said filters are transversal filters including tapped delay lines and are adapted to minimize the output error thereof based on the following algorithm:

$$\tfrac{1}{2}\nabla_{\{W_{II}\}} E [e_I]^2 = E\{Z_I\} e_I,$$

$$\tfrac{1}{2}\nabla_{\{W_{IQ}\}} E [e_Q]^2 = -E \{Z_I\} e_Q,$$

$$\tfrac{1}{2}\nabla_{\{W_{QI}\}} E [e_I]^2 = E \{Z_Q\} e_I, \text{ and}$$

$$\tfrac{1}{2}\nabla_{\{W_{QQ}\}} E [e_Q]^2 = -E \{Z_Q\} e_Q, \text{ wherein}$$

$\nabla$ is gradient $W_{II}$, $W_{IQ}$, $W_{QI}$ and $W_{QQ}$ are the transversal filter tap coefficients (gains), {} represents multiple taps in the transversal filter, E = expected value $e_I$ and $e_Q$ refer to I and Q channel errors which are a result of the difference between the linear equalized output and data estimation output of the hard limiter, $Z_I$ and $Z_Q$ are the equalizer inputs of the I and Q channel, respectively.

4. The equalizer according to claim 1 wherein the first and second tapped delay lines have spcings equal to or less than one data symbol time.

5. A quadraphase shift keyed (QPSK) adaptive equalizer for equalizing incoming demodulated QPSK signals, comprising:

in-phase (I) and quadrature (Q) channel equalizer filters adapted to minimize the output error of the equalizer;

first and second means for adjusting in-phase and quadrature channel equalizer filter operating characteristics, respectively;

said first and said second means providing different adjustments to said in-phase channel equalizer filter and said quadrature channel equalizer filter continuously in reponse to the incoming QPSK signals which have been distorted in an unknown time varying manner differently for the in-phase and quadrature channels;

tapped delay lines and equalizer coefficient generators for the I and Q channels; and a data estimater and a matched filter interposed between the outputs of the equalizer filters and inputs of the equalizer coefficient generators for the I and Q channels.

* * * * *